UNITED STATES PATENT OFFICE.

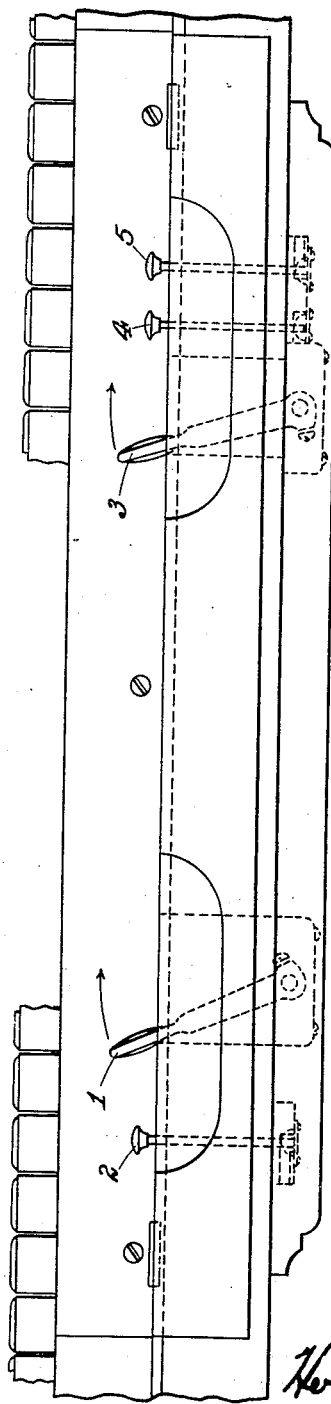

HERBERT R. DAWSON, OF LEWISHAM, ENGLAND, ASSIGNOR TO EDGAR ROBERT MORLEY, FRANK MORLEY, AND HERBERT REGINALD DAWSON, ALL OF LEWISHAM, LONDON, S. E. 13, ENGLAND.

PIANO-PLAYER.

1,355,653.  Specification of Letters Patent.  Patented Oct. 12, 1920.

Application filed May 18, 1920. Serial No. 382,284.

*To all whom it may concern:*

Be it known that I, HERBERT REGINALD DAWSON, a subject of the King of Great Britain and Ireland, and resident of Lewisham, in the county of Kent, England, have invented new and useful Improvements in Piano-Players, of which the following is a specification.

This invention has relation to piano players and it has reference to the control levers and buttons by which alterations and variations in the tonal effects obtainable are effected and controlled, and which are divided into two sets and are mounted, as usual, one opposite each hand of the performer, below and in front of the key board or clavier, and are connected with the parts they control in well-known manner.

In accordance with this invention, the set of controls operated by the left hand of the performer comprises a sustaining button and a tempo lever, and the set of controls operated by the right hand of the performer comprises a crescendo lever and bass and treble accent buttons.

The accompanying drawing is an elevational view showing part of a key board or clavier and the controls arranged in accordance with this invention.

The several control levers and buttons are divided into two sets and placed one opposite each hand of the performer. The one set comprises the tempo lever 1 and the sustaining button 2. These two controls are placed toward the left hand side or end of the key board or clavier, and they are, further, so arranged that the tempo lever is held between the forefinger and thumb of the left hand of the performer and the sustaining button is operated by the little finger of the same hand. The other set of the controls comprises the crescendo lever 3, the bass accent button 4 and treble accent button 5. These controls are placed toward the right hand side or end of the key board or clavier and their arrangement is further such that the crescendo lever which tends always to assume the soft or diminuendo position by reason of the action of a spring thereon, is actuated by the thumb of the right hand of the performer, the bass and treble accent buttons being actuated by the most convenient finger of the same hand.

What I claim is:—

A piano player having the controls divided into two sets and mounted one opposite each hand of the performer, wherein the set operated by the left hand of the performer comprises a sustaining button and a tempo lever, and the set operated by the right hand of the performer comprises a crescendo lever and bass and treble accent buttons.

Dated this 27th day of April, 1920.

H. R. DAWSON.